United States Patent
Yi et al.

(10) Patent No.: US 9,603,163 B2
(45) Date of Patent: Mar. 21, 2017

(54) METHOD AND APPARATUS FOR SUPPORTING SCHEDULING GROUPS OF DEVICES CHARACTERISTICS IN A WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Hyangsun You, Seoul (KR); Bonghoe Kim, Seoul (KR); Dongyoun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/439,727

(22) PCT Filed: Nov. 1, 2013

(86) PCT No.: PCT/KR2013/009865
§ 371 (c)(1),
(2) Date: Apr. 30, 2015

(87) PCT Pub. No.: WO2014/069946
PCT Pub. Date: May 8, 2014

(65) Prior Publication Data
US 2015/0282208 A1    Oct. 1, 2015

Related U.S. Application Data

(60) Provisional application No. 61/721,476, filed on Nov. 1, 2012.

(51) Int. Cl.
*H04W 72/12*    (2009.01)
*H04L 1/18*    (2006.01)
(Continued)

(52) U.S. Cl.
CPC ....... *H04W 72/1289* (2013.01); *H04L 1/1851* (2013.01); *H04L 1/1861* (2013.01);
(Continued)

(58) Field of Classification Search
CPC ....... H04W 4/005; H04W 4/08; H04W 8/186; H04W 68/00; H04W 68/005; H04W 68/02;
(Continued)

(56) References Cited

U.S. PATENT DOCUMENTS 8,811,961 B2 *   8/2014   Lee .................. H04L 1/1607
                                                        370/216
9,131,480 B2 *   9/2015   Huang ............. H04W 72/0406
(Continued)

OTHER PUBLICATIONS

ITRI, 'Discussion on RAN enhancements for group paging in MTC'. 3GPP TSG-RAN WG2 #74, R2-113199, Barcelona, Spain, May 9-13, 2011 (http://www.3gpp.org/ftp/tsg_ran/wg2_r12/tsgr2_74/Docs/) See p. 1, lines 20-23: and p. 2, lines 37-39.
(Continued)

*Primary Examiner* — Michael Thier
*Assistant Examiner* — Eric Nowlin
(74) *Attorney, Agent, or Firm* — Dentons US LLP

(57) ABSTRACT

A method for and apparatus for supporting scheduling groups based on devices characteristics in a wireless communication system is provided. A wireless device receives a group identification (ID) to monitor a physical downlink control channel (PDCCH) for Machine Type Communication (MTC), receives the PDCCH with the group ID at a predetermined subframe, and configures a physical downlink shared chancel (PDSCH) and a physical uplink shared chancel (PUSCH) shared with MTC UEs by the PDCCH of grant. And, more efficient and accurate scheduling with
(Continued)

lower complexity and reduction of control overhead, for multi-UEs is provided in this invention.

13 Claims, 11 Drawing Sheets

(51) Int. Cl.
*H04W 72/04* (2009.01)
*H04L 1/00* (2006.01)

(52) U.S. Cl.
CPC ....... *H04W 72/042* (2013.01); *H04W 72/121* (2013.01); *H04L 2001/0093* (2013.01)

(58) Field of Classification Search
CPC ............. H04W 68/025; H04W 72/042; H04W 72/0446; H04W 72/121; H04W 72/1278; H04W 76/048; H04W 84/027; H04W 72/1289; H04W 76/042; H04W 76/121; H04W 76/1278; H04L 63/104; H04L 1/1671; H04L 1/1854; H04L 61/2069; H04L 1/1851; H04L 1/1861; H04L 2001/0093

See application file for complete search history.

(56) References Cited

U.S. PATENT DOCUMENTS

| | | | | |
|---|---|---|---|---|
| 9,357,420 B2* | 5/2016 | Ahn | ...... | H04L 5/0007 |
| 9,438,399 B2* | 9/2016 | Kim | ...... | H04L 1/0046 |
| 2009/0143072 A1* | 6/2009 | Montojo | ...... | H04W 68/02 455/450 |
| 2011/0039568 A1 | 2/2011 | Zhang et al. | | |
| 2012/0052860 A1 | 3/2012 | Faronius et al. | | |
| 2012/0064932 A1* | 3/2012 | Lim | ...... | H04W 4/005 455/509 |
| 2012/0155406 A1* | 6/2012 | Kim | ...... | H04W 4/005 370/329 |
| 2012/0185576 A1* | 7/2012 | Qu | ...... | H04W 4/08 709/223 |
| 2012/0257552 A1* | 10/2012 | Chen | ...... | H04L 5/001 370/280 |
| 2012/0281647 A1* | 11/2012 | Kuo | ...... | H04L 1/1812 370/329 |
| 2013/0015953 A1* | 1/2013 | Hsu | ...... | H04W 4/005 340/7.46 |
| 2013/0035067 A1* | 2/2013 | Zhang | ...... | H04L 63/08 455/411 |
| 2013/0042011 A1* | 2/2013 | Sugizaki | ...... | H04W 4/005 709/227 |
| 2013/0083753 A1* | 4/2013 | Lee | ...... | H04W 72/0453 370/329 |
| 2013/0136072 A1* | 5/2013 | Bachmann | ...... | H04W 4/00 370/329 |
| 2013/0165101 A1* | 6/2013 | Han | ...... | H04W 76/046 455/418 |
| 2013/0195041 A1* | 8/2013 | Papasakellariou | .. | H04W 72/042 370/329 |
| 2013/0272148 A1* | 10/2013 | Fong | ...... | H04W 28/02 370/252 |
| 2013/0301501 A1* | 11/2013 | Olvera-Hernandez | | H04W 76/048 370/311 |
| 2014/0133430 A1* | 5/2014 | Yang | ...... | H04L 1/1854 370/329 |
| 2014/0233515 A1* | 8/2014 | Chen | ...... | H04W 4/005 370/329 |
| 2014/0369326 A1* | 12/2014 | Wang | ...... | H04W 4/005 370/336 |
| 2015/0078224 A1* | 3/2015 | Xiong | ...... | H04L 1/1887 370/280 |
| 2015/0245350 A1* | 8/2015 | Webb | ...... | H04L 5/0053 370/329 |
| 2015/0282208 A1* | 10/2015 | Yi | ...... | H04W 72/121 370/329 |
| 2015/0365921 A1* | 12/2015 | Wu | ...... | H04W 4/005 370/329 |
| 2016/0119900 A1* | 4/2016 | You | ...... | H04L 5/0094 370/336 |

OTHER PUBLICATIONS

LG Electronics, 'Downlink control signaling enhancements in Rel-11', 3GPP TSG RAN WG1 Meeting #66bis, R1-113266, Zhuhai, China, Oct. 10-14, 2011 (http://www.3gpp.org/ftp/tsg_ran/wgl_r11/TSGR1_66b/Docs/) See p. 1, lines 1-3, 29-32.

IPWireless Inc., 'A review of ePDCCH support for MTC operation', 3GPP TSG RAN WG1 Meeting #68bis, R1-120960, Jeju Island, South Korea, Mar. 26-30, 2012 (htto://www.3gpp.org/ftp/tsg_ran/wgl_r11/TSGR1_68b/Docsn See p. 1; and p. 2, line 35-p. 3, line 7.

* cited by examiner

US 9,603,163 B2

METHOD AND APPARATUS FOR SUPPORTING SCHEDULING GROUPS OF DEVICES CHARACTERISTICS IN A WIRELESS COMMUNICATION SYSTEM

This application is a 35 USC §371 National Stage entry of International Application No. PCT/KR2013/009865 filed on Nov. 1, 2013, and claims priority to U.S. Provisional Application No. 61/721,476 filed on Nov. 1, 2012, all of which are hereby incorporated by reference in their entireties as if fully set forth herein.

TECHNICAL FIELD

The present invention relates to wireless communications, and more particularly, to a method and apparatus for supporting scheduling groups based on devices characteristics in a wireless communication system supporting multiple carriers.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The ccommercialization of the 3GPP LTE (A) system is being recently accelerated. The LTE systems are spread more quickly as respond to users-demand for services that may support higher quality and higher capacity while ensuring mobility, as well as voice services. The LTE system provides for low transmission delay, high transmission rate and system capacity, and enhanced coverage.

To increase the capacity for the users-demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals are required to transmit between the eNB and the UE to support inter-cell interference reduction and carrier extensions. An efficient allocation scheme for a new data communication which is not necessarily human interaction newly is needed for low cost and complexity. For example, the new form of data communication without a human communications can be a Machine Type Communication (MTC).

DISCLOSURE

Technical Problem

The present invention provides a method and apparatus for supporting scheduling groups based on devices characteristics in a wireless communication system supporting multiple carriers.

The present invention also provides a method and apparatus for configuring a group for machine type communication (MTC) UEs to transmit and receive a signal in a wireless communication system.

The present invention also provides a method and apparatus for configuring a new Downlink Control Information (DCI) for the MTC UEs in a wireless communication system.

Technical Solution

In an aspect, a method for supporting a scheduling group in a wireless communication system, performed by a wireless device is provided. The method may include receiving a group identification (ID) to monitor a physical downlink control channel (PDCCH) for Machine Type Communication (MTC), receiving the PDCCH with the group ID at a predetermined subframe, and configuring a physical downlink shared chancel (PDSCH) and a physical uplink shared chancel (PUSCH) shared with MTC UEs by the PDCCH of grant.

The method may further include the PDCCH is shared by multiple MTC UEs by the group ID.

The method may further include receiving a physical downlink control channel (PDCCH) for Machine Type Communication (MTC), determining resource allocation by a Downlink Control Information (DCI) compacted, configuring a physical downlink shared chancel (PDSCH) and a physical uplink shared chancel (PUSCH) shared with MTC UEs by the DCI, wherein the DCI includes information by omitting at least one or more of a Modulation and Coding Scheme (MCS), a New Data Indicator, HARQ (Hybrid automatic repeat request) information and Redundancy Version, a Power control command for the PUSCH (TPC), a Cyclic shift for uplink Demodulation reference signal (DM-RS), a request of an aperiodic channel quality information (CQI) report, and at least one of resource assignment and frequency hopping flag for the MTC.

In another aspect, a wireless device for supporting a scheduling group in a wireless communication system is provided. The wireless device includes a radio frequency unit for receiving a radio signal; and a processor, operatively coupled with the radio frequency unit, configured to: receive a group identification (ID) to monitor a physical downlink control channel (PDCCH) for Machine Type Communication (MTC), receive the PDCCH with the group ID at a predetermined subframe, and configure a physical downlink shared chancel (PDSCH) and a physical uplink shared chancel (PUSCH) shared with MTC UEs by the PDCCH of grant, wherein the PDCCH is shared by multiple MTC UEs by the group ID.

Advantageous Effects

This invention provides a group shared by multiple MTC UEs and new format of control information for the MTC UEs used for data transmission. More details, this invention can includes that multiple UEs and Normal UEs where each UE containing single CC or multiple CCs with different carriers, for example, the MTC UEs and Normal UEs are configured for a group of a PDCCH each of a corresponding service. Therefore, this invention may keep benefits of more efficient cell planning and scheduling with lower complexity and reduction of control overhead, for multi-UEs in wireless communication system.

MODE FOR INVENTION

Figure 1:
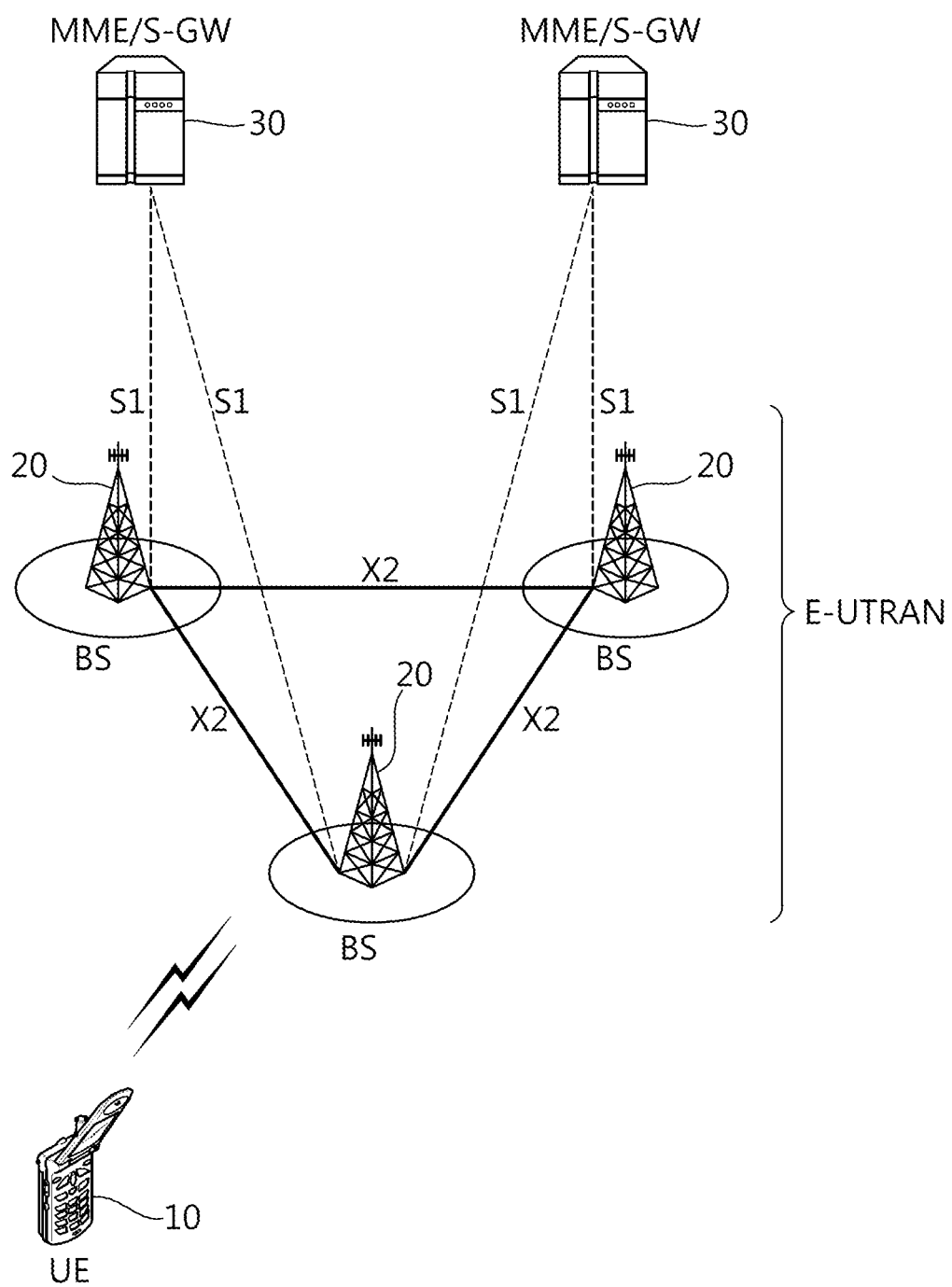
FIG. 1 is view illustrating a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
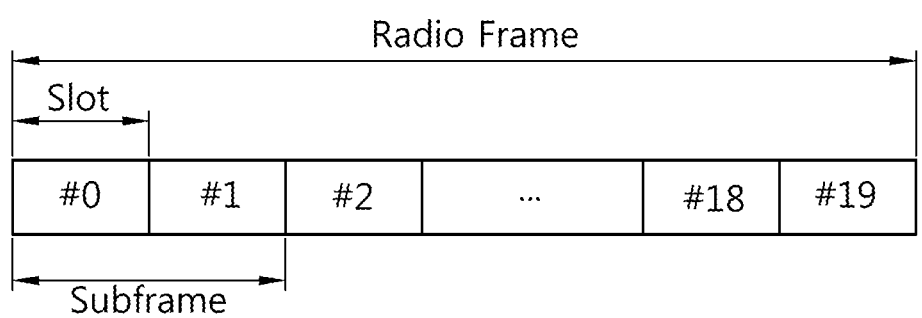
FIG. 2 shows the structure of a radio frame to which the present invention is applied.

FIG. 2 shows the structure of a radio frame to which the present invention is applied.

Referring to FIG. 2, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE and may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration (configuration) of the CP (Cyclic Prefix). The CP includes an extended CP (CP) and a normal CP (normal CP). For example, if the OFDM symbol is composed by normal CP are 7, if configured by the extended CP, in the extended CP case are included 6 OFDM symbols in one slot. If the channel status is unstable, as in the case of the terminal, such as moving at a fast pace, the extended CP can be used to further reduce the inter-symbol interference.

The structure of the radio frame is only illustrative, and the number of subframes included in a radio frame or the number of slots included in a subframe and the number of OFDM symbols included in a slot may be changed in various ways. In relation to resource allocation, a physical resource structure is first described followings.

Figure 3:
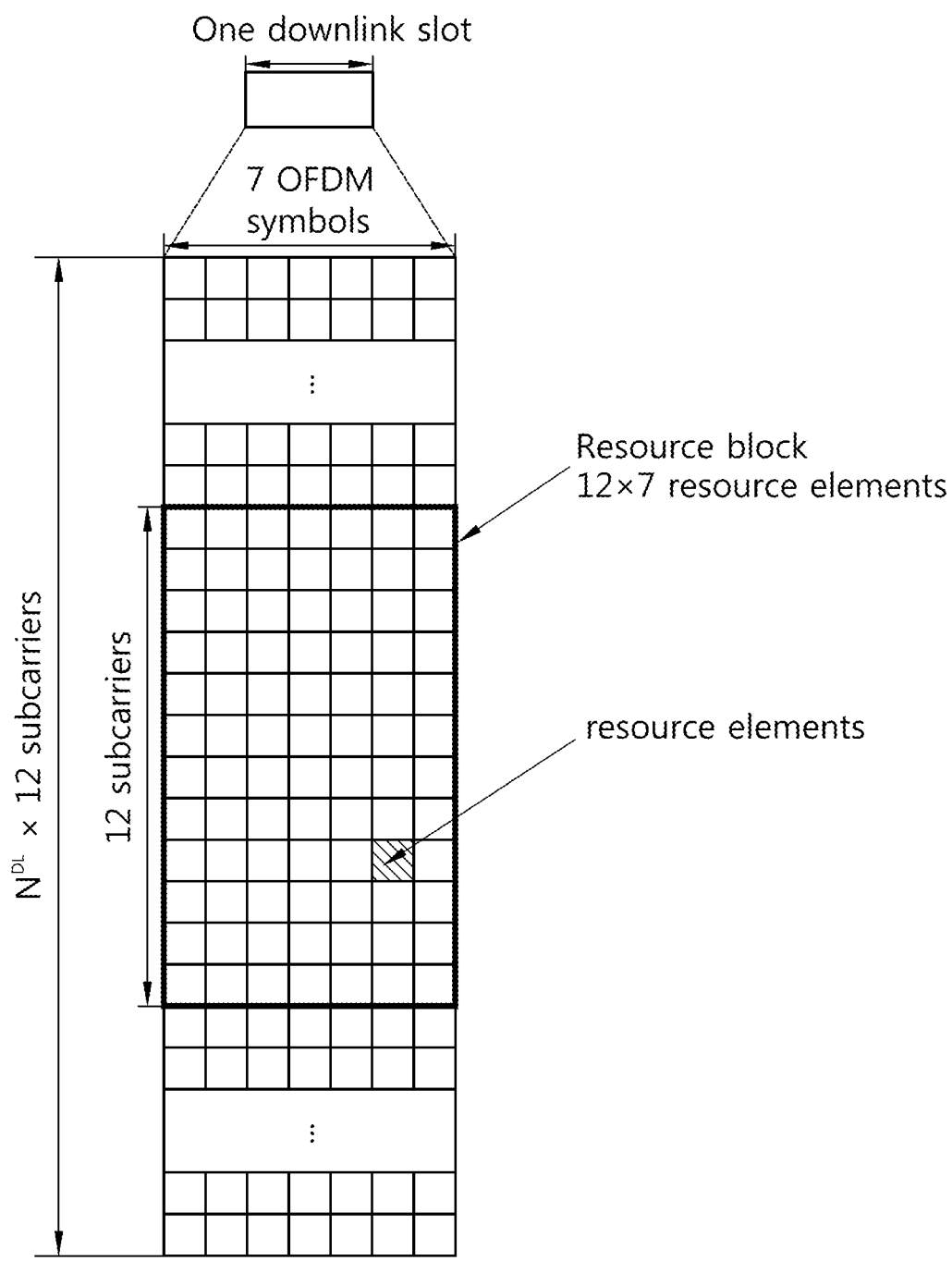
FIG. 3 is an exemplary diagram showing a resource grid for one downlink slot to which the present invention is applied.

FIG. 3 is an exemplary diagram showing a resource grid for one downlink slot to which the present invention is applied.

Referring to FIG. 3, the downlink slot includes a plurality of OFDM symbols in the time domain. Here, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7(6)REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 4:
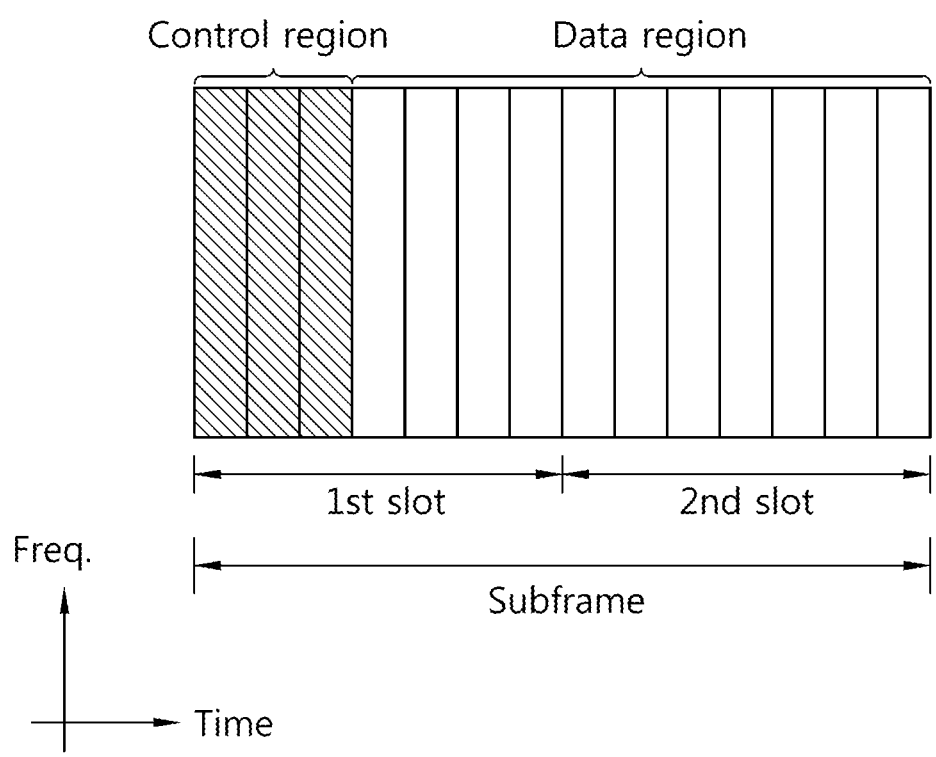
FIG. 4 shows the structure of a downlink subframe to which the present invention is applied.

FIG. 4 shows the structure of a downlink subframe to which the present invention is applied.

Referring to FIG. 4, a subframe includes two slots. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated.

Examples of downlink control channels used in the 3GPP LTE include a Physical Control Format Indicator Channel (PCFICH), a Physical Downlink Control Channel (PDCCH)/an enhanced PDCCH (EPDCCH), and a Physical Hybrid-ARQ Indicator Channel (PHICH)/EPHICH.

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH/EPDCCH.

The PHICH/EPHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH/EPDCCH, that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCH/EPDCCHs may be transmitted within the control region, and a UE can monitor a plurality of PDCCH/EPDCCHs.

As described, the physical channel in this invention includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH) or optionally added an Enhanced PDCCH (EPDCCH), i.e., an L1/L2 control channel. When 0 OFDM symbols of the first slot within the subframe is used for control region, EPDCCH can be placed in data region which conveys control information.

*52Again, PDCCH/EPDCCHs are transmitted on one Control Channel Element (CCE)/ECCE or on an aggregation of some contiguous CCE/ECCEs. A CCE (ECCE) is a logical assignment unit for providing a coding rate according to the state of a radio channel to a PDCCH/EPDCCH. A CCE/ECCE corresponds to a plurality of resource element groups (REGs). The format of a PDCCH/EPDCCH and the number of possible bits of a PDCCH/EPDCCH are determined by a correlation between the number of CCE(ECCE)s and a coding rate provided by CCE(ECCE)s.

Control information transmitted through a PDCCH/EPDCCH is called Downlink Control Information (hereinafter referred to as DCI). The DCI includes uplink or downlink scheduling information or includes an uplink transmit (Tx) power control command for arbitrary UE groups. The DCI is differently used depending on its format, and it also has a different field that is defined within the DCI. Table 2 shows DCI according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

Table 3 shows the DCI of Format 0, that is, uplink resource allocation information (or an uplink grant).

TABLE 3

Carrier indicatoror-0 or 3 bits
Flag for identifying Format 0/Format 1A-1 bit, 0 indicates Format 0, 1 indicates Format 1A.
Frequency hopping flagbit-1 bit, is a Most Significant Bit (MSB) corresponding to resource allocation at need and used to assign multiple clusters.
Resource block assignment and hopping resource allocation-
$\lceil \log_2(N_{RB}^{UL}(N_{RB}^{UL} + 1)/2) \rceil$ bits
PUSCH hopping (corresponding to only single cluster assignment):
    $N_{UL\_hop}$ MSBs are used to obtain an $n_{PRB}(i)$ value.
    ($\lceil \log_2(N_{RB}^{UL}(N_{RB}^{UL} + 1)/2) \rceil - N_{UL\_hop}$) bits provide the resource allocation of the first slot of an uplink subframe.
In single cluster assignment, non-hopping PUSCH
($\lceil \log_2(N_{RB}^{UL}(N_{RB}^{UL} + 1)/2) \rceil$) bits provide the resource allocation of an uplink subframe.
In multi-cluster assignment, non-hopping PUSCH: Resource assignment is obtained from a combination of a frequency hopping flag field and a resource block assignment and hopping resource allocation field.

$\left\lceil \log_2\left(\binom{\lceil N_{RB}^{UL}/p + 1\rceil}{4}\right) \right\rceil$ bits provide resource allocation in an uplink subframe. Wherein, P depends on the number of downlink resource blocks.
Modulation and coding scheme/redundancy version-5 bits
New data indicator-1 bit
TPC command for a scheduled PUSCH-2 bits
Cyclic shift and OCC index for DM RS-3 bits
Uplink index-2 bits, only exist for a TDD operation, that is, an uplink-downlink configuration 0
Downlink Assignment Index (DAI)-2 bits, only exist for TDD operations, that is, uplink-downlink configurations 1-6
CQI request-1 or 2 bits, a 2 bit field is applied to a UE configured using at least one downlink cell.
SRS request-0 or 1 bit.
Multi-cluster flag-1bit.

The flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

For example, in Table 3, if the resource allocation field has 13 bits in a band of an FDD 20 MHz, an uplink grant has a total of 27 bits (except a CIF field and a CRC field). If the length of bits determined as the input of blind decoding is 28 bits, a BS makes the uplink grant the total number of 28 bits by adding the redundant bits of 1 bit to the uplink grant at the time of scheduling. Here, all the redundant bits may be set to 0 because they do not include special information. Of course, the number of redundant bits may be smaller than or greater than 2.

The wireless communication system as 3GPP LTE of the present invention uses blind decoding for PDCCH/EPDCCH detection. The blind decoding is a scheme in which a desired identifier is de-masked from a CRC of a PDCCH/EPDCCH (referred to as a candidate PDCCH/EPDCCH) to determine whether the PDCCH/EPDCCH is its own channel by performing CRC error checking.

An eNB determines a PDCCH/EPDCCH format according to DCI to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH/EPDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
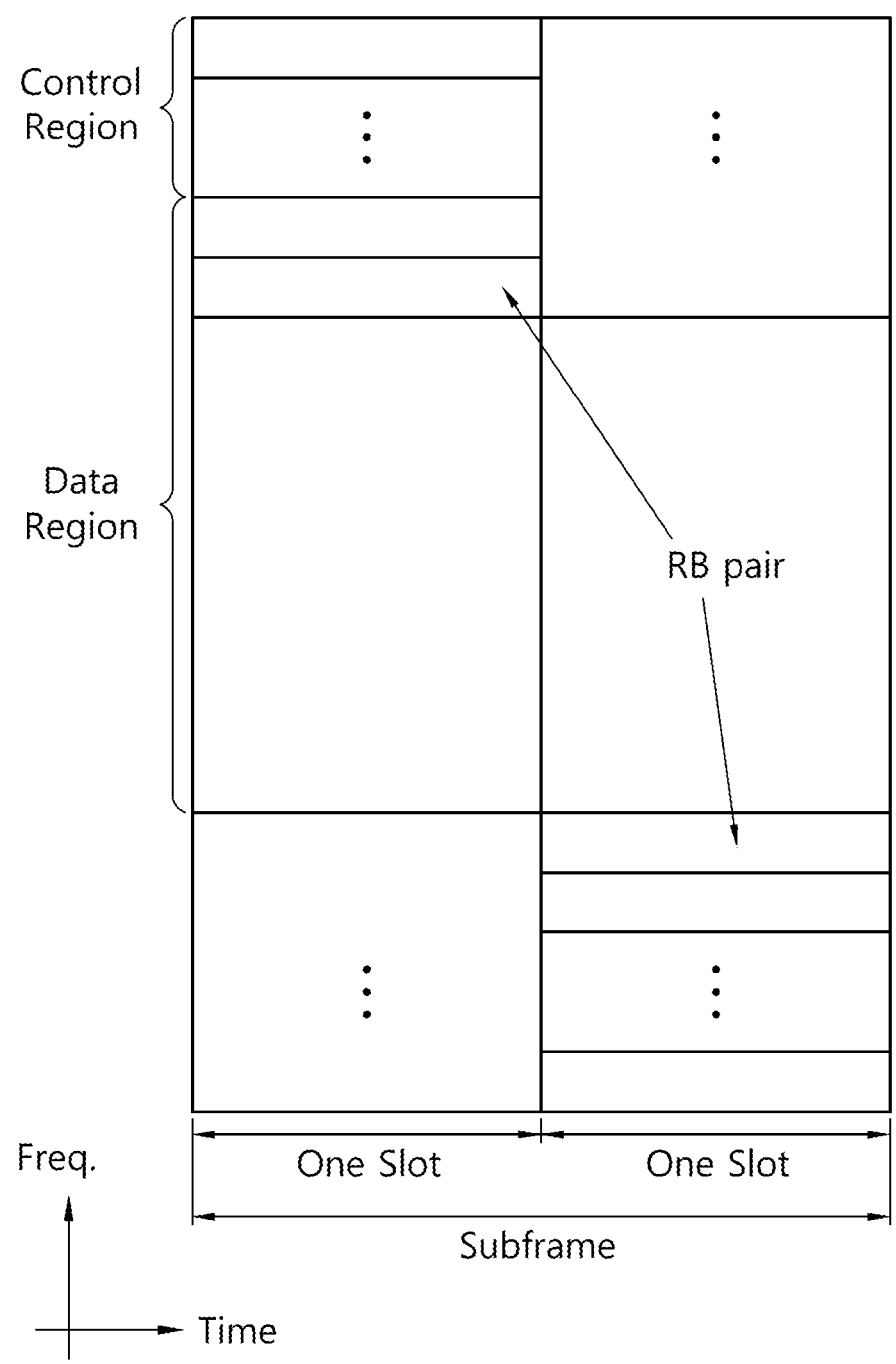
FIG. 5 is a view illustrating an example of a structure of an uplink subframe to which the present invention is applied.

FIG. 5 is a view illustrating an example of a structure of an uplink subframe carrying an ACK/NACK signal to which the present invention is applied.

Referring to FIG. 5, an uplink subframe may be divided into a control region to which a physical uplink control channel (PUCCH) that carries uplink control information is allocated, herein; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair are resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. Meanwhile, as the increased demands for the high data rate transmission, the mobile communication system composed of aggregated multiple CCs (component carriers) is being researched.

Figure 6:
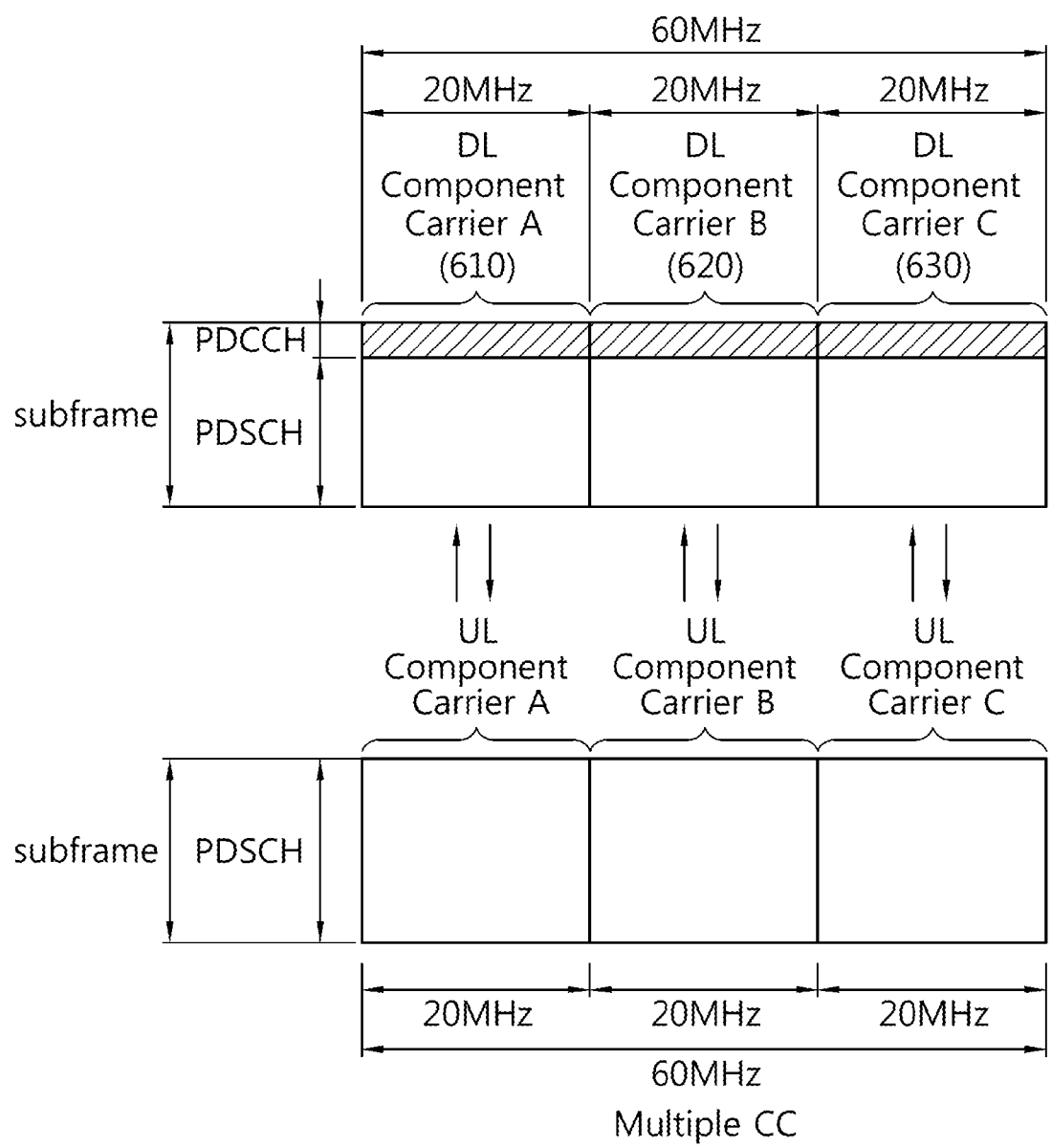
FIG. 6 shows an exemplary concept for a carrier aggregation (CA) technology according to an exemplary embodiment of the present invention.

FIG. 6 shows an exemplary concept for a carrier aggregation (CA) technology according to an exemplary embodiment of the present invention.

Referring to FIG. 6, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

Hereinafter, a CC may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or a RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a $7^{th}$ bit from the left, which are the remaining indices other than 0, i.e., the index of the Pcell. Herein, the index of the serving cell may be a logical index determined relatively for each UE, or may be a physical index for indicating a cell of a specific frequency band. And the CA system supports a non-cross carrier scheduling (self-carrier scheduling).or, cross carrier scheduling.

Figure 7:
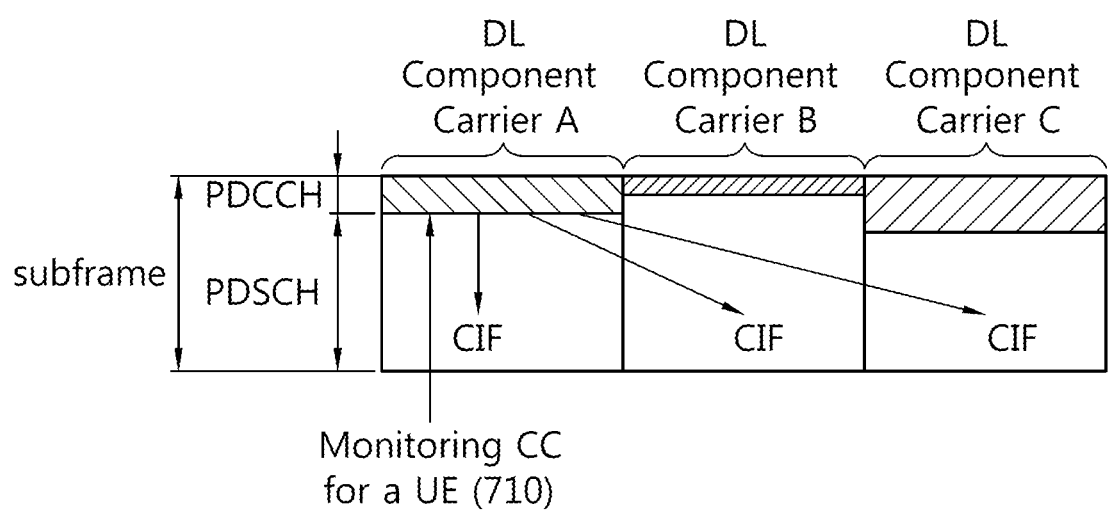
FIG. 7 shows an exemplary concept for a subframe structure with CIF for cross-CC scheduling according to an exemplary embodiment of the present invention.

FIG. 7 shows an exemplary concept for a subframe structure with CIF for cross-CC scheduling according to an exemplary embodiment of the present invention.

Referring to FIG. 7, for cross-CC scheduling of UEs, the introduction of carrier indicator field (CIF) has been considered. The baseline of PDCCH transmission for LTE-A is summarized as below, and configuration for the presence or absence of the CIF within PDCCH is semi-statically and UE-specifically enabled by higher layer signaling.

If the CIF disabled, it means that PDCCH on a DL CC assigns PDSCH resources on the same DL CC and PUSCH resources on a single linked UL CC, and No CIF is used, so same as Rel-8 PDCCH structure, that is, same coding, same CCE-based resource mapping and DCI formats is used. Whereas, the CIF enabled, it configures that PDCCH on a DL CC can assign PDSCH or PUSCH resources in one of multiple aggregated DL/UL CCs using the CIF, the Rel-8 DCI formats extended with the CIF, the CIF (if configured) is a fixed 3-bit field and, the CIF (if configured) location is fixed irrespective of DCI format size. Reusing Rel-8 PDCCH structure (same coding, same CCE-based resource mapping) can be used.

That is, in the case of presence of CIF, desirably, the eNB may assign the PDCCH monitoring DL CC set for reduction of blind decoding complexity at the UE side. This CC set is a portion of the entire aggregated DL CCs and the UE only performs detection/decoding of PDCCHs scheduled for it on this set. In other words, to schedule PDSCH/PUSCH for a UE, the eNB transmits PDCCHs only through the PDCCH monitoring DL CC set. The PDCCH monitoring DL CC set may be set UE-specific or UE-group-specific or cell-specific. For example, FIG. 7 shows a DL subframe for a LTE-A UE for which 3 DL CCs are aggregated, and DL CC A is configured as the PDCCH monitoring DL CC. If the CIF is disabled, each DL CC can transmit only the PDCCH scheduling it own PDSCH without the CIF, by following the Rel-8 PDCCH principle. On the other hand, if the CIF is enabled by UE-specific higher layer signaling, only DL CC A can transmit the PDCCHs scheduling not only it own PDSCH but also PDSCHs of the other CCs, by using the CIF. Note that no PDCCH is transmitted on DL CC B and C which are not configured as the PDCCH monitoring DL CC.

In LTE-A system, a UE may receive data from multiple PDSCHs through multiple DL CCs so that it should transmit multiple ACK/NACKs through one or multiple UL CCs in a subframe. Transmitting multiple ACK/NACKs using PUCCH ACK/NACK format 1a/1b in a subframe requires large transmit power and increases the PAPR of UL transmission signal so that the UE 의 coverage from the eNB will be decreased due to the inefficient utilization of transmit power amplifier. ACK/NACK bundling or ACK/NACK multiplexing may be used to enable single PUCCH (Format 1a/1b) transmission in this case. However, when there are too many ACK/NACK bits to transmit due to many CCs and/or more number of DL subframes than UL subframes in TDD mode, applying those methods directly may not enable single PUCCH (Format 1a/1b) transmission.

Figure 8:
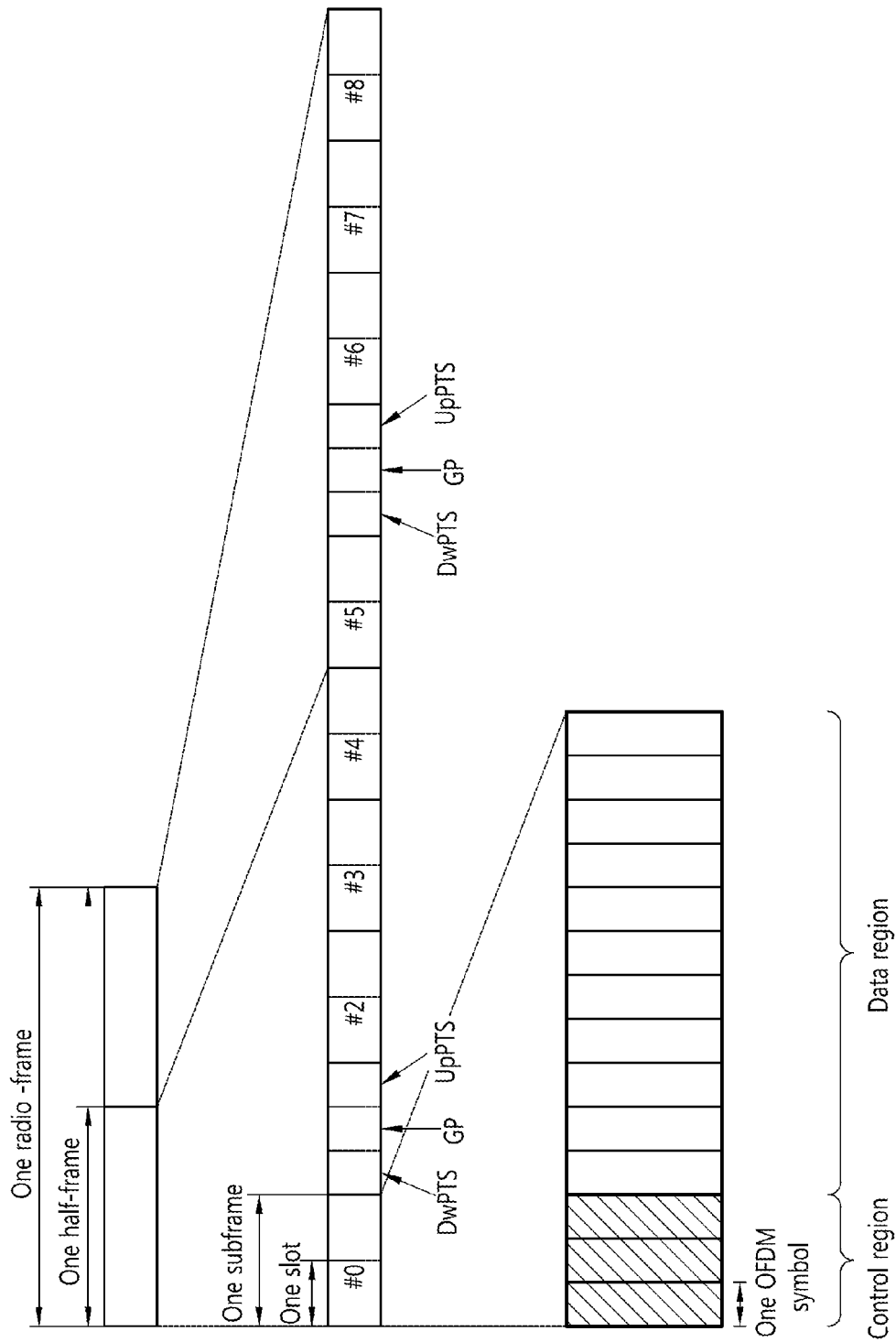
FIG. 8 shows an exemplary concept for a frame structure type 2 according to an exemplary embodiment of the present invention.

FIG. 8 shows an exemplary concept for a frame structure type 2 with 5 ms switch-point periodicity according to an exemplary embodiment of the present invention.

Referring to FIG. 8, a frame structure type 2 is applicable to TDD. Each radio frame of length $T_f=307200 \cdot T_s=10$ ms consists of two half-frames of length $153600 \cdot T_s=5$ ms each. Each half-frame consists of five subframes of length $30720 \cdot T_s=1$ ms. The supported uplink-downlink configurations are listed in Table 5 where, for each subframe in a radio frame, D denotes the subframe is reserved for downlink transmissions, U denotes the subframe is reserved for uplink transmissions and S denotes a special subframe with the three fields DwPTS, GP and UpPTS. The length of DwPTS and UpPTS is given by Table 4 subject to the total length of DwPTS, GP and UpPTS being equal to $30720 \cdot T_s=1$ ms. Each subframe i is defined as two slots, 2i and 2i+1 of length $153600 \cdot T_s=5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

In case multiple cells are aggregated, the UE may assume the same uplink-downlink configuration across all the cells and that the guard period of the special subframe in the different cells have an overlap of at least $1456 \cdot T_s$.

TABLE 5

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As described, the smallest time-frequency unit for downlink transmission is denoted a resource element. A subset of the downlink subframes in a radio frame on a carrier supporting PDSCH transmission can be configured as Multimedia Broadcast Single Frequency Network (MBSFN) subframes by higher layers. Each MBSFN subframe is divided into a non-MBSFN region and an MBSFN region. Here, the non-MBSFN region spans the first one or two OFDM symbols in an MBSFN subframe where the length of the non-MBSFN region. Transmission in the non-MBSFN region shall use the same cyclic prefix length as used for subframe 0. The MBSFN region in an MBSFN subframe is defined as the OFDM symbols not used for the non-MBSFN region.

Herein the PDSCH shall be processed and mapped to resource elements with the following exceptions, In resource blocks in which UE-specific reference signals are not transmitted, the PDSCH shall be transmitted on the same set of antenna ports as the PBCH, which is one of $\{0\}$, $\{0, 1\}$ or $\{0, 1, 2, 3\}$. In resource blocks in which UE-specific reference signals are transmitted, the PDSCH shall be transmitted on antenna port(s) $\{5\}$, $\{7\}$, $\{8\}$, or $\{7, 8, \ldots, v+6\}$, where v is the number of layers used for transmission of the PDSCH. The PDSCH may be transmitted in MBSFN subframes not used for PMCH transmission in which case the PDSCH shall be transmitted on one or several of antenna port(s) $p \in \{7, 8, \ldots, v+6\}$, where v is the number of layers used for transmission of the PDSCH.

Furthermore, an enhanced version of MBMS is explained in this invention. A cell edge spectrum efficiency in an urban or suburban environment of 1 bps/Hz—equivalent to the support of at least 16 Mobile TV channels at around 300 kbps per channel in a 5 MHz carrier is included as targets. This is only achievable by exploiting the special features of

TABLE 4

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — | the LTE OFDM air interface in a Single Frequency Network mode. It was also recognized that the user experience is not purely determined by the data rate achieved, but also by other factors such as the interruption time when switching channels. This has implications for the design of the MBMS control signaling, which is also being extensively redesigned for LTE of this invention. For a Single Frequency Network for MBMS as a key new feature of LTE is the possibility to exploit the OFDM radio interface to transmit multicast or broadcast data as a multi cell transmission over a synchronized Single Frequency Network, this is known as the MBSFN operation.

In MBSFN operation, MBMS data is transmitted simultaneously over the air from multiple tightly time-synchronized cells. A UE receiver will therefore observe multiple versions of the signal with different delays due to the multi cell transmission. Provided that the transmissions from the multiple cells are sufficiently tightly synchronized for each to arrive at the UE within the cyclic prefix at the start of the symbol, there will be no Inter Symbol Interference (ISI). In effect, this makes the MBSFN transmission appear to a UE as a transmission from a single large cell, and the UE receiver may treat the multi cell transmissions in the same way as multipath components of a single-cell transmission without incurring any additional complexity. The UE does not even need to know how many cells are transmitting the signal.

This Single Frequency Network reception leads to significant improvements in spectral efficiency compared to UMTS Release 6 MBMS, as the MBSFN transmission greatly enhances the SINR. This is especially true at the cell edge, where transmissions which would otherwise have constituted inter-cell interference are translated into useful signal energy—hence the received signal power is increased at the same time as the interference power being largely removed.

An example of the improvement in performance achievable using MBSFN transmission compared to single-cell point-to-multipoint transmission is described. In this example, the probability of achieving a randomly-located UE not being in outage (defined as MBMS packet loss rate<1%) is plotted against spectral efficiency of the MBMS data transmissions (a measure of MBMS data rate in a given bandwidth). A hexagonal cell-layout is assumed, with the MBSFN area comprising 1, 2 or 3 rings around a central cell for which the performance is evaluated. It can be seen that the achievable data rates increase markedly as the size of the MBSFN area is increased and hence the surrounding inter-cell interference is reduced. A 1 km cell radius is assumed, with 46 dBm eNB transmission power, 15 m eNB antenna height and 2 GHz carrier frequency.

MBSFN data transmission takes place via a Multicast Channel (MCH) transport channel, which is mapped to a Physical Multicast Channel (PMCH). In addition to some specific aspects of the corresponding control channel, the key features of the PMCH to support MBSFN transmission are, an extended Cyclic Prefix (CP) is used (~17 μs instead of ~5 μs). As the differences in propagation delay from multiple cells will typically be considerably greater than the delay spread in a single cell, the longer CP helps to ensure that the signals remain within the CP at the UE receivers, thereby reducing the likelihood of ISI. This avoids introducing the complexity of an equalizer in the UE receiver, at the expense of a small loss in peak data rate due to the additional overhead of the longer cyclic prefix. Or a Reference Signal (RS) pattern is modified compared to non-MBSFN data transmission. The reference symbols are spaced more closely in the frequency domain than for non-MBSFN transmission, reducing the separation to every other subcarrier instead of every sixth subcarrier. This improves the accuracy of the channel estimate which can be achieved for the longer delay spreads. The channel estimate obtained by the UE from the MBSFN RS is in fact a composite channel estimate, representing the composite channel from the set of cells transmitting the MBSFN data.

In addition to these enhancements for MBSFN transmission, a second OFDM parameterization is provided in LTE specifically for downlink-only multicast/broadcast transmissions. This has an even longer CP, double the length of the extended CP, resulting in approximately 33 μs. This is designed to cater for deployments with very large differences in propagation delay between the signals from different cells (i.e. typically up to 10 km). This is most likely to occur for deployments at low carrier frequencies and large inter-site distances.

In order to avoid further increasing the overhead arising from the CP in this case, the number of subcarriers per unit bandwidth is also doubled, giving a subcarrier spacing of 7.5 kHz. The cost of this is an increase in inter-carrier interference, especially in high mobility scenarios with a large Doppler spread. In choosing whether to use the 7.5 kHz subcarrier spacing, there is therefore a trade-off between support for wide-area coverage and support for high mobile velocities. It should be noted, however, that the maximum Doppler shift is lower at the low carrier frequencies which are likely to be used in the typical deployment scenario for the 7.5 kHz subcarrier spacing. The absolute frequency spacing of the reference symbols for the 7.5 kHz is the same as for the 15 kHz subcarrier spacing MBSFN pattern, resulting in a RS on every fourth subcarrier.

Meanwhile, this invention proposes a few approaches to accommodate low cost Machine Type Communication (MTC) in LTE system where MTC UEs may have the following characteristics. More details, the MTC is a form of data communication which involves one or more entities that do not necessarily need human interaction. A service optimized for the MTC differs from a service optimized for Human to Human communications (H2H).

MTC is different to current mobile network communication services as involving (1) No human in the loop where MTC UEs will be communicated with eNB directly without any human intervention once they are deployed (2) infrequent active communication where data volume between MTC UEs and eNB is limited and very low (3) long sleep cycle to save battery, etc. The proposed invention includes the DRX operation to be applicable to a DRX operation of a machine to machine (M2M) device or a MTC device. As described, the MTC is one type of data communication including one or more entities not requiring human interactions. That is, the MTC refers to the concept of communication performed by a machine device, not a terminal used by a human user, by using the existing wireless communication network. The machine device used in the MTC can be called an MTC device. There are various MTC devices such as a vending machine, a machine of measuring a water level at a dam, etc.

Figure 9:
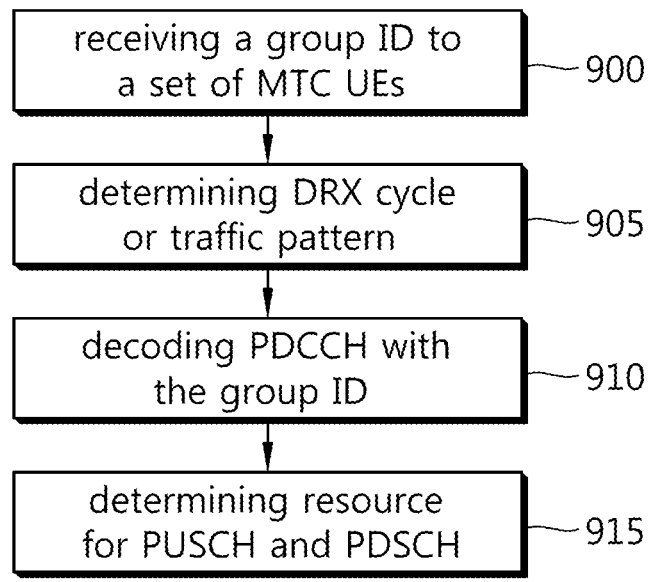
FIG. 9 shows an exemplary concept for grouping of MTC UEs according to an exemplary embodiment of the present invention.

More details, FIG. 9 shows an exemplary concept for grouping of MTC UEs according to an exemplary embodiment of the present invention. Solutions for scheduling these MTC UEs of the efficiency of resource consumption and scheduling for the LTE system can be provided in this invention. This invention proposes a multiplexing scheme where multiple MTC UEs share the same allocated PUSCH resource by a PDCCH grant for efficient MTC support of the LTE system. This invention considers only static MTC UE as mobile MTC UE may follow legacy protocol to be efficient. Herein the invention provides followings.

(1) Grouping to support a large number of MTC UEs: it is expected that one eNB may have to support between 1000 to more than 10K MTC UEs. Scheduling the large number of MTC UEs would not be a simple issue. This invention proposes one or more group of the MTC UEs using grouping based on hashing function to lower scheduling complexity and control message overhead.

(2) Low battery consumption: assuming MTC UE wakes up periodically to check paging, read PDCCH for downlink control/data, upload any data requested/scheduled, etc. The invention targets to minimize the wake-up time to complete any action required at each duty cycle. To minimize the wake-up time, there are two things to consider, one is waiting time to get DL data or receive UL grant i.e., schedule should be aligned with a duty cycle, and the other is handling clock drift between eNB and MTC UE occurred during a sleep cycle. For the first, this invention proposes repeated UL grant (which can be done either by paging or PDCCH grant), mini_RRC_Connected state where MTC UE can be serviced for normal data operations without requiring full responsibilities such as cell selection and neighbor monitoring, and lastly relaxed HARQ process. For the latter, it proposes a few rules to address out-of-sync issue.

(3) Small data packet size: it is assumed that common traffic pattern in MTC will be UL-heavy where DL will be mostly used for sending control/configuration information whereas UL mostly carries actual data from MTC devices. Moreover, the packet size from each MTC device at one time is estimated to be small (e.g., <1000b). This leads that most MTC UE will use only one or two RB (Resource Blocks) assuming 16QAM to transmit a packet at one time. It is also expected that there will be large portions of small data (less than ~200b) which may not even consume the whole RB. This invention proposes a new PUSCH resource mapping.

For example, if each MTC UE transmits data every 30 seconds, there are 10K MTC UEs connected to the macro eNB in a cell, and one subframe can have less than 100 CCEs with maximum DL bandwidth of 100RB is assumed. To schedule 10K MTC UEs without using pre-determined SPS, it needs 10K PDCCH to be transmitted with assigned PUSCH resources. As MTC UE is not tightly synchronized with eNB and may not support high MCS, PDCCH for MTC UEs may be transmitted with aggregation level 2 or 4 (even 8). Assuming aggregation level 4 is used, 4 CCE*10K REs are used over 30 seconds period to schedule PUSCH for 10K MTC UEs. This will become around 3-4% overhead for MTC UE PDCCH assuming 3 symbols are used for PDCCH in every subframe with 10 Mhz DL bandwidth. The control overhead for MTC increases as the operating system bandwidth decreases. If PDCCH for PDSCH is considered, the overhead will be further increased. Data rate from 10K MTC UEs will be around 350 Kbps assuming 1000 bits packet size, which is less than 1% of maximum UL data rate 50 Mbps (assuming Category 1 UE) even without considering HARQ process overhead and RS signaling overhead. Considering normal data transmission, in general 1 CCE is used to schedule about 10Kbits. If control overhead of MTC to that of regular cat-1 UE, it is around 40 times more. This is not negligible in terms of spectral efficiency if there is a large number of MTC UEs.

This invention provides that one PDCCH can be shared by multiple MTC UEs by grouping. Instead of sending separate PDCCH for each MTC UE, eNB groups MTC UEs to a number of groups where scheduling and ACK/NACK occurs at the group level. The scheduling includes downlink data A/N disabling, PUSCH—large RB allocation with random selection of RB. And this invention provides a compact DCI for MTC UEs. As some of fields in legacy DCI formats may not be needed in MTC, and also resource allocation can be simplified as resources used by MTC at one time is very small, a reduced new DCI format can be provided.

Referring to FIG. 9, One way of grouping PDCCH is to assign a group ID (MTC-G-RNTI) to a set of MTC UEs and scramble PDCCH with MTC-G-RNTI. Each MTC UE can be informed which group it is belong to via RRC signaling along with an index within the group (900). One way of assigning group ID is to use hash function where hash function produces n-bits from C-RNTI, and use most-significant n to n-k bits are used for group ID and n-k-1 to 1 bits can be used for the index within a group. Using hashing function, it may still have collision case to resolve. Thus, MTC UE shall be informed a unique group and index decided by eNB.

Another approach of grouping is based on period of DRX cycle or traffic pattern as the set of MTC UEs in the same group will be scheduled together, they should be aligned.

For example, DRX is a scheme for reducing battery consumption by allowing UE to discontinuously monitor a downlink channel. When the DRX is configured, the UE discontinuously monitors the downlink channel. Otherwise, the UE continuously monitors the downlink channel. So, a proper DRX is needed to configure for reducing battery consumption. In this invention, the UE checks the group ID and then adjusts the DRX cycle with a predetermined duty cycle as active time to receive the PDCCH to minimize the wake-up time (905).

Figure 10:
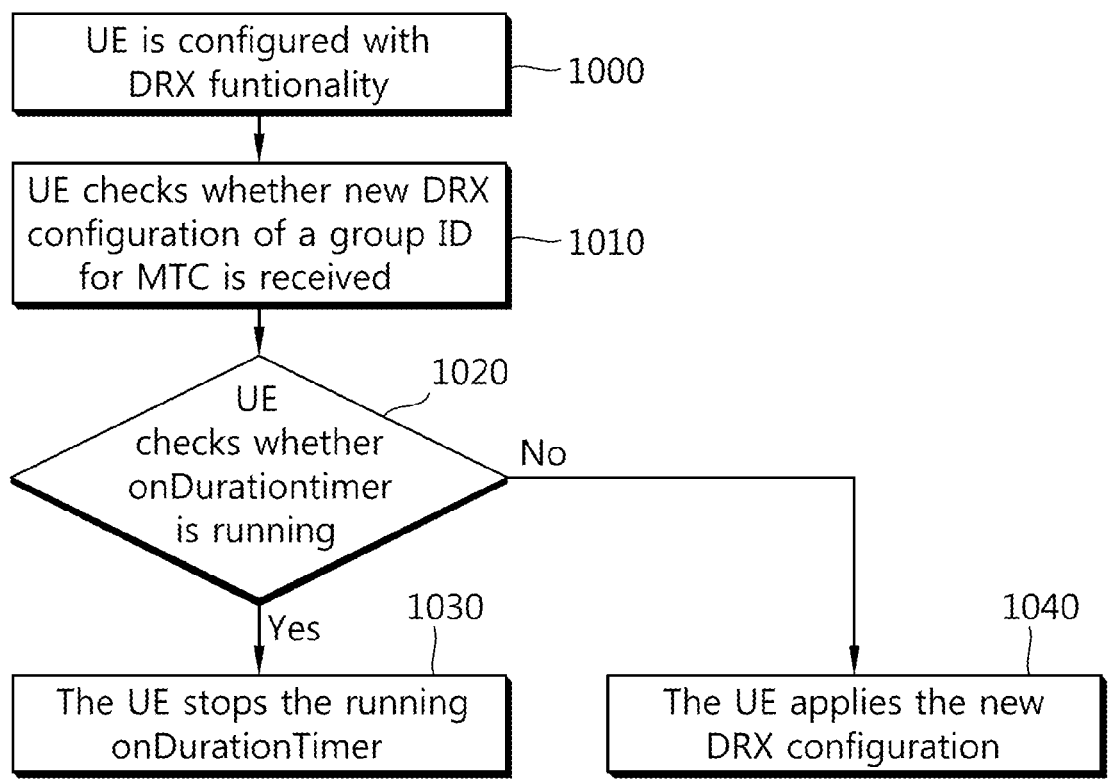
FIG. 10 shows an example of a flow chart for controlling a PDCCH monitoring time of a MTC UE group according to an exemplary embodiment of the present invention.

For more explanations, a flow chart by controlling the onDuration to receive the PDCCH of the MTC UE group according to an exemplary embodiment of the present invention is shown in FIG. 10 as an example. Referring to FIG. 10, the UE is configured with DRX functionality by RRC signaling, including onDurationTimer, drx-InactivityTimer, drx-RetransmissionTimer, drxStartOffset, and optionally shortDRX-cycle, drxShortCycleTimer for a DRX configuration (1000). When DRX is configured, the UE shall for each subframe.

If a HARQ RTT Timer expires in this subframe and the data of the corresponding HARQ process was not successfully decoded, the UE starts the drx-Retransmission timer for the corresponding HARQ process. If a DRX Command MAC CE (control element) is received, the UE stops onDuration timer and drx-Inactivity timer. If drx-InactivityTimer expires or a DRX Command MAC CE is received in this subframe, when the Short DRX cycle is configured, and the UE starts or restarts drx-ShortCycle timer and uses the Short DRX Cycle, else the UE uses the Long DRX cycle. If drx-ShortCycle timer expires in this subframe, the UE uses the Long DRX cycle.

If the Short DRX Cycle is used and [(SFN*10)+subframe number] modulo (shortDRX-Cycle)=(drxStartOffset) modulo (shortDRX-Cycle), or if the Long DRX Cycle is used and [(SFN*10)+subframe number] modulo (longDRX-Cycle)=drxStartOffset, the UE starts onDuration timer.

During the Active Time, for a PDCCH-subframe, if the subframe is not required for uplink transmission for half-duplex FDD UE operation and if the subframe is not part of a configured measurement gap, the UE monitors the PDCCH. Here, when the PDCCH indicates a DL transmission or if a DL assignment has been configured for this subframe, the UE starts the HARQ RTT timer for the corresponding HARQ process or stops the drx-Retransmission timer for the corresponding HARQ process. Whereas, if the PDCCH indicates a new transmission (DL or UL), the UE starts or restarts drx-Inactivity timer.

When not in Active Time, type-0-triggered SRS shall not be reported. If CQI masking (cqi-Mask) is setup by upper layers, when onDurationTimer is not running, CQI/PMI/RI/PTI on PUCCH shall not be reported, else when not in Active Time, CQI/PMI/RI/PTI on PUCCH shall not be reported.

As mentioned, the active-time is defined a total duration that the UE is awake. This includes the on-duration of the DRX cycle, the time UE is performing continuous reception while the inactivity timer has not expired and the time UE is performing continuous reception while waiting for a DL retransmission after one HARQ RTT. Based on the above the minimum active time is of length equal to on-duration, and the maximum is undefined (infinite).

Furthermore, the UE in this invention can be configured or reconfigured with a new DRX configuration including a new DRX cycle according to a group ID for a corresponding MTE UE group by RRC signaling (1010). When the UE receives the new DRX configuration, the UE checks whether the onDurationTimer is running or not (1020). That is, the UE can determine that the onDurationtimer in active with the predetermined time value using before the new DRX configuration. Hererin the UE can determine to update the new DRX cycle as the duty cycle. The UE also can determine whether any one among the onDurationTimer, drx-InactivityTimer, drx-RetransmissionTimer, drxStartOffset, shortDRX-cycle, and drxShortCycleTimer may be changed according to the PDCCH monitoring time with MTC-G-RNTI. For example, this invention show that the OnDuration as the PDCCH monitoring time with MTC-G-RNTI specified includes the time to get DL data/UL grant as aligning with a duty cycle and the clock drift of MTC UE occurred during a sleep cycle. If the UE identifies that one of the new DRX configuration is modified or changed, UE can stop the running onDurationTimer started to change the sleep mode (1040). Otherwise, the UE determines as same as the previous DRX configuration, and keeps the running onDuration timer (1030). Therefore, the UE saves power consumption more effectively. It provides that the UE controls to monitor the PDCCH for DL/UL transmission and immediately applies the new DRX configuration according to the MTC group with a new DRX reconfiguration.

In FIG. 9, the grouping can be done based on location where MTC UEs within one location can be grouped as they may share similar channel environment (similar CQI estimation). Each MTC UE, once it can decode PDCCH with MTC-G-RNTI successfully, based on index that UE has, it determines resource for PUSCH and PDSCH accordingly. The resource allocation to each MTC UE within a group can be either mapped via RB assignment in DCI or decided based on configuration. If RB is assigned via DCI, the RB assignment field in DCI format should be changed to accommodate multiple UEs. If RB is determined based on index via RRC signaling, one example of RRC signaling includes that assigned_RB_for_index_i=start_PRB+m*i, where each MTC UE uses m RBs where m can be RRC signaled.

More details, this invention show an exemplary concept for a compact DCI format of MTC UEs according to an exemplary embodiment of the present invention.

As described with Table 3, DCI format 0 used for uplink grant includes the following information, Flag on Format 0 or 1A, Resource assignment and frequency hopping flag, Modulation and Coding Scheme (MCS), New Data Indicator, HARQ information and Redundancy Version, Power control command for scheduled PUSCH (TPC), Cyclic shift for uplink Demodulation RS, Request for transmission of an aperiodic CQI report.

As focusing on static MTC UEs, it is that MCS, TPC, DMRS may not change dynamically, and would be rather static. Thus, in this invention provides a compact DCI to the exclusion of the MCS, TPC, NDI, HARQ information, and DM-RS. That is, the compact DCI can be omitted with at least one or more of the MCS and/or, TPC and/or, New Data Indicator and/or HARQ information and Redundancy version and/or Cyclic shift for uplink Demodulation RS.

More details, in MCS case, if MCS is omitted, either higher-layer signaling is given to a MTC UE with a semi-statically configured IMCS value or a MTC UE assumes that IMCS=0 or a MTC UE assumes that BPSK is used. When a UE assumes BPSK is used, the size of TB can be determined based on IMCS=0 in the TBS table in Rel-10 specification where the actual TBS=floor (TBS obtained from the table/2). For example, when 6 PRB is used for data transmission, TBs size becomes floor (176/2)=88. The higher layer signaling is possible sent the MCS transmission.

In TPC case, if TPC is omitted, either higher-layer signaling is given to a MTC UE with a semi-statically configured power parameters or a MTC UE uses the same power assigned via random access procedure.

In New Data Indicator case, when MTC data is transmitted occasionally, it is not essential to run HARQ process. Thus, a MTC UE may assume every downlink data (or uplink grant) is for a new packet. Reliability may be handled at higher layer.

HARQ information and Redundancy version case, when HARQ is disabled, either higher-layer configuration to disable HARQ process is given or a MTC UE may assume that HARQ will not be used if the compact DCI (without HARQ information) is used.

Cyclic shift for uplink DM-RS case, if CS for uplink DM-RS is omitted, either higher-layer signaling is given to a MTC UE with a semi-statically configured the DM-RS CS or a MTC UE uses the same DM-RS CS used in Msg 3 via random access procedure.

Moreover, each MTC UE may not consume large number of RBs and also it will be beneficial to use frequency-selective scheduling, resource assignment which can be configured via RRC signaling and frequency hopping flag can be omitted as well.

Similar approaches are applicable to DCI format 1A and 1C which may be used for MTC communication. For format 1A, L/DVRB may not be used particularly when a narrow-bandwidth reduction technique is applied for a MTC UE and thus can be omitted. MCS and/or HARQ and/or NDI and/or RV and/or TPC (similar to Format (0) can be omitted. When it is omitted, the same behavior described in Format 0 applies as well. For format 1C, TBS field can be omitted where the behavior is same as MCS in Format 1A if omitted. Note that a new format name can be given to a new format with a few fields omitted.

In fact, resource allocation field can be omitted as well where a MTC UE may assume PDSCH is transmitted over the entire sub-band which the narrow-band MTC UE can read (e.g., center 6 RB). As many fields are omitted, there is no need to have a field to differentiate between format 0 and 1A.

It may be desirable just transmit one bit 0 or 1 for uplink grant and downlink scheduling similar to PUCCH format 1A. When a MTC UE receives a DCI with value 0, the UE will transmit uplink assuming the resource is based on either fixed (e.g., a sub-band) or based on semi-statically configured resource. PUSCH hopping could be applied as well. When needed, resource allocation may come in DCI as well. When a MTC UE receives a DCI with value 1, the UE will look at the sub-band (which the UE can read) to locate PDSCH. As this limits the flexibility at eNB side scheduling, it would be desirable to limit this behavior only to MTC UEs experiencing coverage issue.

In this invention, a new DCI format for the MTC can be defined as one bit field to indicate whether uplink grant or downlink scheduling grant is sent for the UL/DL information, and optional field to include resource allocation.

Before eNB uses resource allocation field, it will configure the MTC UE to enable the use of resource allocation. Or a UE may assume resource allocation may be present by default, and eNB can disable the use of resource allocation via higher layer signaling.

Furthermore, a UE can be higher-layer configure with a set of DCI formats for (1) CSS and USS respectively (2) common for CSS and USS (3) only for USS. For example, a new DCI format A can be configured to a UE for the USS and a new DCI format derived from format 1C without removing TBS (or reduced TBS field size) for the CSS can be configured. Moreover, depending on the RNTI that the UE receives, UE may assume a certain set of DCI formats are used for (1) CSS and USS respectively (2) common for CSS and USS (3) only for USS. For example, if RNTI % N=0, UE may assume DCI format for the MTC is used for USS.

Furthermore, Aggregation Level Signaling is provided as reducing BD. To decrease the overall MTC UE cost, it is necessary to minimize any processing requirement on MTC UEs. With consideration of applying reduction of bandwidth requirement from 20 Mhz to say 1.4 Mhz, a MTC UE certainly would not be able to read the legacy PDCCHs span over the entire system bandwidth (if system bandwidth is larger than 1.4 Mhz). Therefore, a separate control channels such as via ePDCCH may have to be delivered to MTC UEs where MTC UE may not need to support all the aggregation levels. For instance, via random access, a serving cell may estimate the aggregation level for a MTC UE and configure a MTC UE with one or a few aggregation levels so that the number of blind decoding that a MTC UE shall perform can be decreased. Furthermore, it is likely that a certain MTC UE may suffer from a coverage issue where it is placed in the basement. In that case, higher aggregation level (such as 32, 64 . . . ) may need to be supported for a MTC UE. Thus, the higher layer signaling may include the set of aggregation levels that the MTC UE may need to look at.

Figure 11:
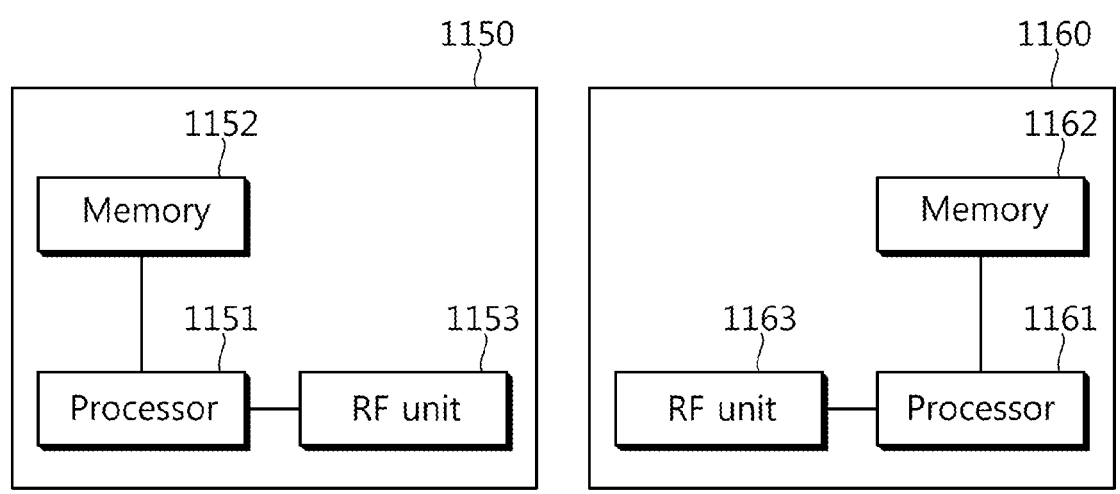
FIG. 11 shows a block diagram showing a wireless communication system according to an exemplary embodiment of the present invention.

FIG. 11 is a block diagram showing a wireless communication system according to an embodiment of the present invention.

A BS 1150 includes a processor 1151, a memory 1052, and a radio frequency (RF) unit 1153. The memory 1152 is coupled to the processor 1151, and stores a variety of information for driving the processor 1151. The RF unit 1153 is coupled to the processor 1151, and transmits and/or receives a radio signal. The processor 1151 implements the proposed functions, procedures, and/or methods. In the embodiments of FIG. 2 to FIG. 11, the operation of the BS can be implemented by the processor 1151.

Especially, the processor 1151 may configure one or more group of MTC UEs by using grouping based C-RNTI or UE specific RNTI using a hashing function to lower scheduling complexity and control message overhead. The eNB groups MTC UEs to a number of groups where scheduling and ACK/NACK occurs at the group level. Also, the processor 1151 may configure a new DRX cycle or traffic pattern as the set of MTC UEs, herein the DRX cycle with a predetermined duty cycle to minimize active time to receive the PDCCH. So, the eNB groups the new DRX configuration according to the MTC group and to send RRC configuration to MTC group UE.

Furthermore, the processor 1151 may configure a compact DCI format of MTC UEs, the compact DCI includes a new format with a few fields omitted selectively. The processor 1151 may configure separate control channels such as via ePDCCH to be delivered to MTC UEs according to each aggregation level of the MTC UE. Herein, signals of DRX configurations, sets of aggregation levels, or group IDs for the MTE UEs include RRC signals or MAC signals. The PDCCH is signaled using the new DCI and the group IDs for the MTE UEs to corresponding UE.

Whereas, a wireless device 1160 includes a processor 1161, a memory 1162, and an RF unit 1163. The memory 1162 is coupled to the processor 1161, and stores a variety of information for driving the processor 1161. The RF unit 1163 is coupled to the processor 1161, and transmits and/or receives a radio signal. The processor 1161 implements the proposed functions, procedures, and/or methods. In the embodiments of the FIG. 2 to FIG. 11, the operation of the UE can be implemented by the processor 1161.

Especially, the processor 1161 may receive a RRC signal including signals of DRX configurations, sets of aggregation levels, or group IDs for the MTE UEs. The processor 1161 may determine MTC-G-RNTI with C-RNTI or UE specific RNTI using a hashing function, and decode a PDCCH with MTC-G-RNTI as an example for MTC service. That is, the processor 1161 determines that scheduling includes downlink data A/N disabling, PUSCH-large RB allocation with random selection of RB with a reduced new DCI format called a compact DCI using the MTC-G-RNTI. Herein the processor 1161 may receive the PDCCH for the MTE UE at a predetermined duty cycle in new DRX configuration. The processor 1161 determines that DRX includes OnDuration as the PDCCH monitoring time with MTC-G-RNTI specified includes the time to get DL data/UL grant as aligning with a duty cycle and the clock drift of MTC UE occurred during a sleep cycle. Then, processor 1161 calculates and modifies the active time to monitor PDCCH or ePDCCH of the MTC UE using modified offset and time information of the DRX operation.

The processor 1161 determines the compact DCI to the exclusion of the MCS, TPC, NDI, HARQ information, and DM-RS, or resource assignment and frequency hopping flag. Also, the processor 1161 determines a new DCI format for the MTC can be defined as one bit field to indicate whether uplink grant or downlink scheduling grant is sent for the UL/DL information, and optional field to include resource allocation. And the RB can be signaled by the RRC.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for supporting a scheduling group in a wireless communication system, performed by a wireless device, the method comprising:
   receiving a physical downlink control channel (PDCCH) for a Machine Type Communication (MTC);
   configuring a physical downlink shared channel (PDSCH) and a physical uplink shared channel (PUSCH) shared by a plurality of MTC user equipment (UEs) based on the PDCCH, wherein the plurality of MTC UEs share a group identification (ID); and
   determining a resource allocation based on Downlink Control Information (DCI),
   wherein when the DCI has a value of 0, a UE from amongst the plurality of MTC UEs uses a predetermined sub-band or a semi-configured resource for the PUSCH, and when the DCI has a value of 1, the UE uses a sub-band located in the PDSCH which varies based on the group ID for the PUSCH, and
   wherein the PDCCH is shared by the plurality of MTC UEs based on the group ID.

2. The method of claim 1 further comprising:
   determining the group ID from a Radio Resource Control (RRC) signal, wherein the RRC signal further includes an index within the group ID for the MTC.

3. The method of claim 2, wherein determining the group ID comprises:
   determining the group ID among one or more groups for the plurality of MTC UEs using a hashing function, wherein n-k bits from a Cell-radio network temporary identifier (C-RNTI) of the UE set for the group ID, and n-k-1 to 1 bits set an index of the UE within the group ID using the hashing function.

4. The method of claim 1 further comprising:
   determining a Discontinuous Reception (DRX) cycle or traffic pattern which varies based on the group ID to perform DRX operation of the MTC, wherein OnDuration for the DRX is set by the group ID, the OnDuration is an active time to monitor the PDCCH with a predetermined duty cycle having a long DRX cycle and clock drift during a sleep cycle.

5. The method of claim 1, wherein the group ID is set by grouping at least one of scheduling and ACK/NACK level for the MTC UEs, and wherein the scheduling includes enabling information of an acknowledgement (ACK)/not-acknowledgement (NACK) signal for downlink data, or a resource allocation of the PUSCH.

6. The method of claim 5 further comprising:
   determining a resource block (RB) of the resource allocation which varies based on the group ID, and wherein the RB is determined by an equation which is RB_for_index_i=start_PRB+m*i, where each of the plurality of MTC UEs is allocated m RBs, and where m is signaled by a Radio Resource Control (RRC) signal.

7. A method for supporting a scheduling group in a wireless communication system, performed by a wireless device, the method comprising:
   receiving a physical downlink control channel (PDCCH) for a Machine Type Communication (MTC);
   determining a resource allocation based on Downlink Control Information (DCI); and
   configuring a physical downlink shared channel (PDSCH) and a physical uplink shared chancel (PUSCH) shared by a plurality of MTC user equipment (UEs) based on the DCI,
   wherein the plurality of MTC UEs share a group identification (ID),
   wherein when the DCI has a value of 0, a UE from amongst the plurality of MTC UEs uses a predetermined sub-band or a semi-configured resource for the PUSCH, and when the DCI has a value of 1, the UE uses a sub-band to be located in the PDSCH which varies based on the group ID for the PUSCH, and
   wherein the DCI includes information by omitting at least one or more of a Modulation and Coding Scheme (MCS), a New Data Indicator, HARQ (Hybrid automatic repeat request) information and Redundancy Version, a Power control command for the PUSCH (TPC), a Cyclic shift for uplink Demodulation reference signal (DM-RS), a request of an aperiodic channel quality information (CQI) report, and at least one of a resource assignment and a frequency hopping flag for the MTC.

8. The method of claim 1, wherein the group ID varies based on aggregation level of a bandwidth receiving the PDCCH via an enhanced PDCCH (EPDCCH) with the group ID of the UE.

9. A wireless device for supporting a scheduling group in a wireless communication system, comprising:
   a radio frequency (RF) unit that receives a radio signal; and
   a processor, operatively coupled with the radio frequency unit, wherein the processor:
   controls the RF unit to receive a physical downlink control channel (PDCCH) for a Machine Type Communication (MTC),
   configures a physical downlink shared channel (PDSCH) and a physical uplink shared chancel (PUSCH) shared by a plurality of MTC user equipment (UEs) based on the PDCCH, wherein the plurality of MTC UEs share a group identification (ID), and
   determines a resource allocation based on Downlink Control Information (DCI),
   wherein when the DCI has a value if 0, a UE from amongst the plurality of MTC UEs uses a predetermined sub-band or a semi-configured resource for the PUSCH, and when the DCI has a value of 1, the UE uses a sub-band located in the PDSCH which varies based on the group ID for the PUSCH, and
   wherein the PDCCH is shared by the plurality of MTC UEs based on the group ID.

10. The wireless device of claim 9, wherein the processor further determines the group ID from a Radio Resource Control (RRC) signal, wherein the RRC signal further includes an index within the group ID for the MTC, and the group ID is set by grouping at least one of scheduling and ACK/NACK level for the MTC UEs, and the scheduling includes enabling information of an acknowledgement (ACK)/not-acknowledgement (NACK) signal for downlink data, or a resource allocation of the PUSCH.

11. The wireless device of claim 9, wherein the processor further determines the group ID among one or more groups for the plurality of MTC UEs using a hashing function, wherein n-k bits from a Cell-radio network temporary identifier (C-RNTI) of the UE set for the group ID, and n-k-1 to 1 bits set an index of the UE within the group ID using the hashing function.

12. The wireless device of claim 9, wherein the processor further determines a Discontinuous Reception (DRX) cycle or traffic pattern which varies based on the group ID to perform DRX operation of the MTC, wherein OnDuration for the DRX is set by the group ID, the OnDuration is an active time to monitor the PDCCH with a predetermined duty cycle having a long DRX cycle and clock drift during a sleep cycle.

13. The wireless device of claim 9, wherein the DCI includes information by omitting at least one or more of a Modulation and Coding Scheme (MCS), a New Data Indicator, HARQ (Hybrid automatic repeat request) information and Redundancy Version, a Power control command for the PUSCH (TPC), a Cyclic shift for uplink Demodulation reference signal (DM-RS), a request of an aperiodic channel quality information (CQI) report, and at least one of resource assignment and frequency hopping flag for the MTC.

* * * * *